UNITED STATES PATENT OFFICE.

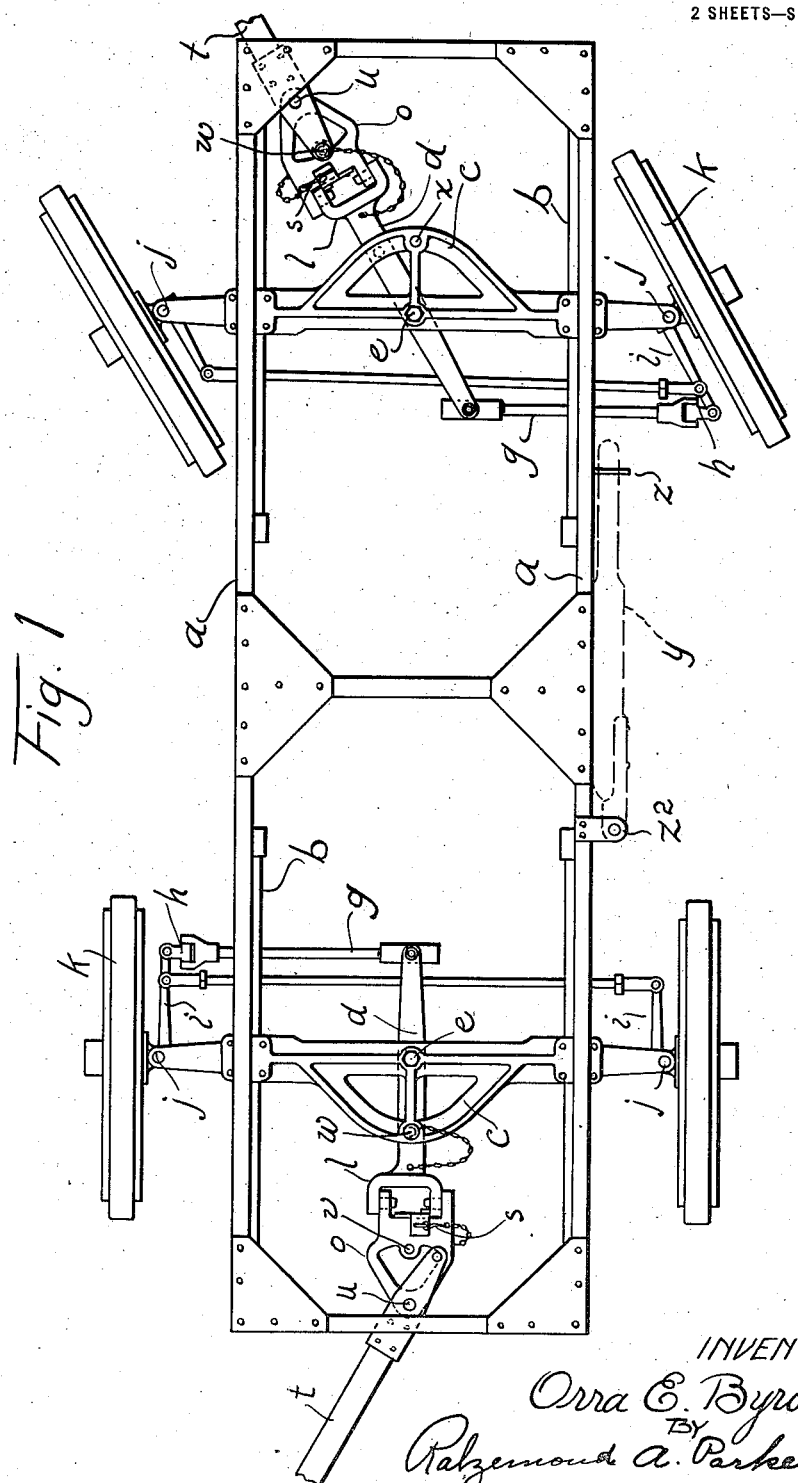

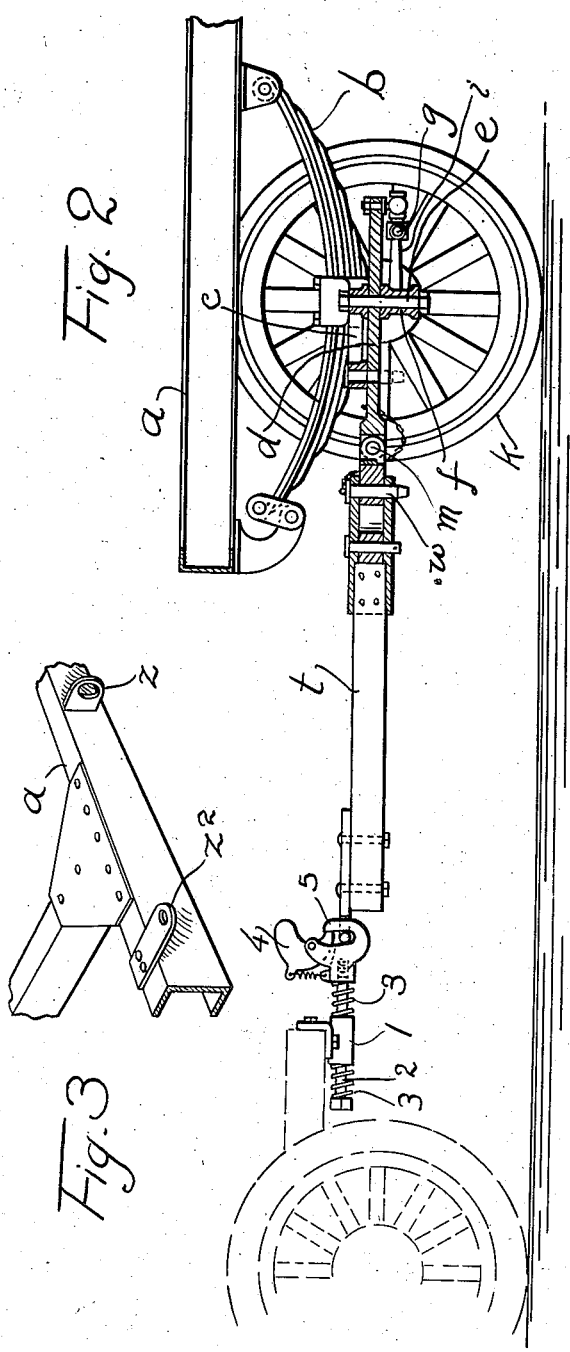
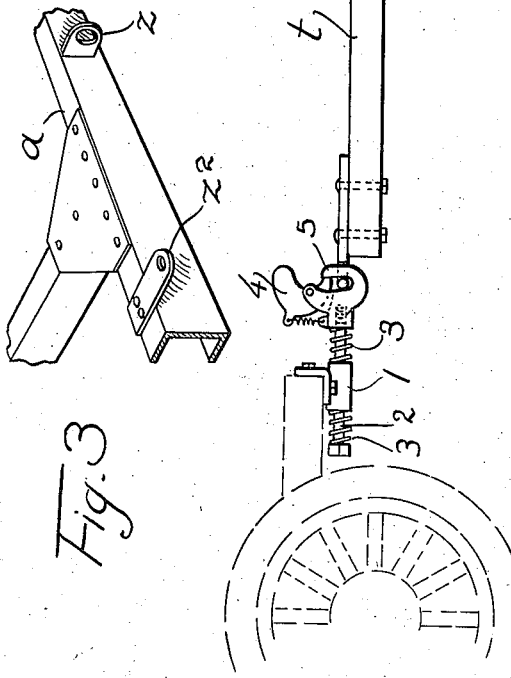
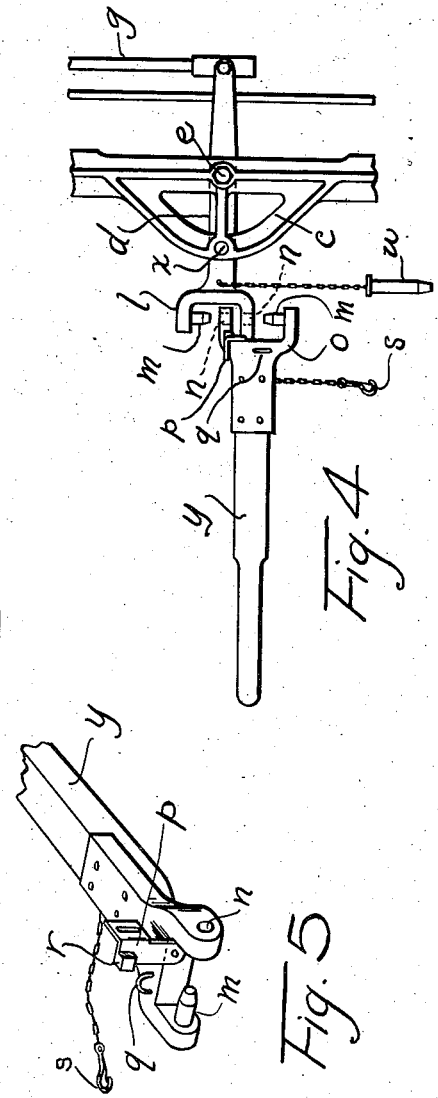

ORRA E. BYRON, OF DETROIT, MICHIGAN, ASSIGNOR TO STEPHEN A. GRIGGS, OF WALKERVILLE, CANADA.

TRAILER.

1,201,800.  Specification of Letters Patent.  Patented Oct. 17, 1916.

Application filed June 21, 1916. Serial No. 105,049.

*To all whom it may concern:*

Be it known that I, ORRA E. BYRON, a citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

This invention relates to trailers and especially trailers to be drawn by automobiles or by tractors.

It has for its object a trailer constructed with steerable pairs of wheels and provided with devices whereby either or both pairs of wheels may be locked in non-steering position or either pair of wheels may be allowed to swivel for steering purposes. This allows the trailer to be drawn either from one end or from the other as convenience may require.

This trailer is provided with a coupler and tongue which are arranged to lock the tongue in swiveling or non-swiveling position. The tongue may be a hand tongue or may be a tongue which connects with the vehicle by which the trailer is being drawn. The hand tongue is ordinarily carried on the trailer so as to allow the backing and drawing of the trailer around by hand when necessary as in putting it away or taking it out for use.

In the drawings, Figure 1 is a plan view. Fig. 2 is a longitudinal section of the front end of the trailer showing the tongue and buffer-coupling by which it is connected with the automobile or other vehicle by which it is drawn. Fig. 3 is a detail of the brackets which carry the hand tongue shown in the dotted lines of Fig. 1. Fig. 4 is a detail in plan of one of the draw bars used at the front and rear of the trailer and showing the hand tongue in process of attachment to the draw bar head. Fig. 5 is a detail of the head used on the tongues, the one here shown being the one used on the hand tongue.

$a$ designates the steel trailer frame in many respects similar to an automobile frame. The front and rear axles, each precisely the same, are connected with the frame $a$ by leaf springs $b$ in the same way that automobile axles are suspended. Each of these axles is provided near its central portion with an integral outwardly extending portion, which is really a segment or part of a spider and will be referred to for convenience of reference as a half spider $c$. At the center of this spider, which is on the axle proper, and below the axle the draw bar $d$ is pivoted upon the bolt $e$ which is provided with a bushing $f$ that is under the draw bar. The inner end of the draw bar $d$ is pivoted to the end of the drag link $g$ which has a universal coupling $h$ with the steering arm $i$. The steering arm $i$ is fastened to the knuckle pin $j$ which is journaled in the knuckles at the ends of the axles which are bifurcated in the same way as the customary construction in automobile front axles. The knuckle pins $j$ are secured to the axle stubs or bearings for the wheels $k$ in the same way that the axle stubs and wheels for automobiles are constructed.

The outer ends of the draw bars are each provided with a head or yoke $l$, one arm provided with a pin $m$ and the other with a perforation $n$. Similarly, the tongues are each provided with a yoke $o$ and the same pin and perforations but their positions are reversed. Referring to Fig. 4, it will be seen that the yokes may be interengaged by bringing one arm of each yoke within the other yoke and then sliding one yoke transversely of the other yoke. This engages both pins in both perforations. They can be locked from disengagement by swinging the hasp $p$ detailed in Fig. 5 down over the staple $q$. This brings the lug $r$ carried on the hasp to the inside of two of the abutting yoke arms as shown in Fig. 1. Any tendency, therefore, of the heads of the yoke to slide apart, puts a dead center thrust upon the hasp and there is little or no likelihood of the yoke becoming disengaged. In order to prevent the hasp from becoming displaced, the snap fastener $s$ carried in a handy position by the chain is snapped over the staple $q$ after the hasp has been fitted over the staple.

When it is desired to draw the trailer with an automobile, tractor or other vehicle, such a tongue as designated *t* (see Fig. 2) is at its front end detachably pivoted to the machine that is drawing the trailer by a buffer-coupling, comprising the suspended sleeve 1 and the draft head 2 playing through the sleeve but yieldingly restrained in moving through in either direction by springs 3. The latch 4 traps the front end of the tongue when swiveled onto the coupling head hook 5. At its rear end the tongue is interlocked with the draw bar *d* in the fashion shown at the right in Fig. 1. Such a tongue *t* is provided with a head which is pivoted to the rear of the tongue at *u*. The extreme rear of the tongue is provided with a perforation which can be brought into registry with the perforation *v* at the middle of the head or coupler. A pin *w* is attached to the draw bar *d* by a chain. Hence, when the pin is dropped into the perforation in the extreme end of the tongue and in the perforation in the coupler, the tongue is locked to the coupler and the draw bar *d* in non-swiveling relation and consequently the course of the vehicle drawing the trailer will cause the front wheels to swivel and steer as required by the travel of the preceding vehicle. When it is desired to back the trailer, this pin can be taken out and put through the perforation *x* in the rim of the spider and thereby lock the wheels from steering as shown at the left in Fig. 1, and the tongue itself will pivot on the pivot *u* as shown at the left in Fig. 1.

The hand tongue *y* is carried upon the side of the frame by pushing the handle in through the perforation in the bracket *z* and dropping the pin of the yoke through the perforation in the bracket *z²* (see Fig. 3). The hand tongue can be used with the wheels either locked in swiveling or non-swiveling position.

What I claim is:

1. In a trailer, the combination of a frame, an axle supporting the same, wheels swiveled to the ends of the axle, steering gear, a draw bar pivoted to the middle of the axle and connecting with the steering gear, an extension or half spider on the one side of the axle provided with a perforation, a pin for passing through said perforation and into the draw bar when desired to lock the draw bar in central position and thereby lock the wheels parallel with the frame, and a tongue that may be connected in swiveling or non-swiveling relation with the end of the draw-bar.

2. In a trailer, the combination of a frame, an axle for supporting the same, wheels swiveled to the ends of the axle, steering gear connecting with the wheels, a draw bar pivoted to the middle of the axle and connecting with the steering gear and provided with a coupling-head or yoke, means for locking the steering gear to the axle to prevent swiveling when not desired, and a tongue provided with a coupling-head or yoke adapted to interlock with the coupling-head of the draw bar either in swiveling or non-swiveling relation.

3. In a trailer, the combination of a frame, an axle for supporting the same, wheels swiveled to the ends of the axle, steering gear connecting with the wheels, a draw bar pivoted to the axle and connecting with the steering gear, a coupling-head on the draw bar, a tongue, a coupling-head on the end of the tongue adapted to engage with the coupling head of the draw bar and arranged to be optionally locked in non-swiveling relation with the tongue or allowed to swivel with the tongue.

4. In a trailer, the combination of a frame, an axle therefor, wheels on the ends of the axle, a draw bar secured to the axle, the said draw bar provided with a coupling-head in the form of a yoke, one arm having a perforation, the other a pin, a tongue, and a coupling-head on the tongue in the form of a yoke provided with a pin and perforation adapted to interengage with the pin and perforation of the coupling-head of the draw bar by sliding the same together.

5. In a trailer, the combination of a frame, wheels for supporting the same, a draw bar having a coupling-head in the form of a yoke provided with arms, one having a pin and the other a perforation, and a tongue provided with a coupling-head in the form of a yoke, one arm of which has a pin and the other a perforation, the said pins and perforations of the yokes being adapted to interengage by sidewise sliding, and means for locking the said yokes from lateral sliding to disengage.

6. In a trailer, the combination of a frame, wheels therefor, a draw bar for the same having a coupling-head in the form of a yoke having arms, one provided with a pin, the other with a perforation, a tongue provided with a coupler head in the form of a yoke, one arm provided with a perforation, the other with a pin, the pins and perforations of the two yokes being arranged to interengage by sliding transversely of the coupling, a staple on one coupling-head, a hasp on the same pivoted to swing down so that a portion of the hasp abuts two arms of the yokes to prevent their separation by sidewise sliding, and means for fitting into the staple to prevent the hasp getting out of locking position.

7. In a trailer, the combination of a frame, wheels for supporting the same, an axle connecting the wheels and frame, said wheels having a swiveling connection with the axle, a steering gear, a draw-bar pivoted to the axle and connecting with the steering gear, a pin and perforation interlock between the axle and the draw-bar when it is desired to lock the wheels in non-steerable position, and a tongue having a pivotal connection with the end of the draw-bar and having further a pin and perforation interlock which may optionally be put into operation to rigidly connect the tongue and the draw-bar, substantially as described.

In testimony whereof, I sign this specification.

ORRA E. BYRON.